US009825872B2

(12) United States Patent
Osuga

(10) Patent No.: US 9,825,872 B2
(45) Date of Patent: Nov. 21, 2017

(54) DATA TRANSMISSION DEVICE, DATA TRANSMISSION METHOD, AND PROGRAM THEREFOR

(71) Applicant: NEC CORPORATION, Tokyo (JP)

(72) Inventor: Toru Osuga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 198 days.

(21) Appl. No.: 14/653,333

(22) PCT Filed: Dec. 17, 2013

(86) PCT No.: PCT/JP2013/083797
§ 371 (c)(1),
(2) Date: Jun. 18, 2015

(87) PCT Pub. No.: WO2014/098096
PCT Pub. Date: Jun. 26, 2014

(65) Prior Publication Data
US 2015/0350097 A1    Dec. 3, 2015

(30) Foreign Application Priority Data

Dec. 19, 2012 (JP) .................................. 2012-276440

(51) Int. Cl.
*H04L 12/50* (2006.01)
*H04L 12/825* (2013.01)
(Continued)

(52) U.S. Cl.
CPC .......... *H04L 47/25* (2013.01); *H04L 12/6418* (2013.01); *H04L 43/0852* (2013.01);
(Continued)

(58) Field of Classification Search
CPC ....................................................... H04W 8/36
(Continued)

(56) References Cited

U.S. PATENT DOCUMENTS 6,992,982 B1    1/2006 Meyer et al.
7,515,540 B2    4/2009 Meyer et al.
(Continued)

FOREIGN PATENT DOCUMENTS

EP          1018821        7/2000
JP       2001-160824       6/2001
(Continued)

OTHER PUBLICATIONS

International Search Report PCT/JP2013/083797 dated Apr. 1, 2014.
(Continued)

*Primary Examiner* — Dang Ton
(74) *Attorney, Agent, or Firm* — Young & Thompson

(57) ABSTRACT

A data transmission device, method, and program therefor that effectively increase throughput even when a delay increase occurs due to a cause other than congestion in the network. The data transmission device (11) is provided with a transmission unit (60) which transmits to a user terminal (30) data requested over a network (20). The data transmission device includes a transmission rate control element (51C) which controls the transmission rate on the basis of the degree of congestion detected by a congestion detection element (51B) during delay measurement by a delay measurement processing unit (40), and a reference value correction processing element (51D) which temporarily corrects the detection criteria used by the congestion detection element; when it has been determined that the delay has increased due to a cause other than congestion. This reference value correction element increases the accuracy of detection processing by the congestion detection element, thereby improving throughput.

20 Claims, 5 Drawing Sheets

(51) Int. Cl.
| | |
|---|---|
| H04L 12/801 | (2013.01) |
| H04L 12/26 | (2006.01) |
| H04L 29/06 | (2006.01) |
| H04L 12/64 | (2006.01) |
| H04W 28/02 | (2009.01) |
| H04L 12/841 | (2013.01) |
| H04L 12/835 | (2013.01) |

(52) U.S. Cl.
   CPC .............. *H04L 47/12* (2013.01); *H04L 69/16* (2013.01); *H04L 47/11* (2013.01); *H04L 47/14* (2013.01); *H04L 47/283* (2013.01); *H04L 47/30* (2013.01); *H04W 28/0236* (2013.01)

(58) Field of Classification Search
   USPC ........................................................ 370/329
   See application file for complete search history.

(56) References Cited

U.S. PATENT DOCUMENTS

| | | | |
|---|---|---|---|
| 8,923,128 | B2 | 12/2014 | Wigell |
| 2008/0212480 | A1 | 9/2008 | Shimonishi |
| 2016/0374133 | A1* | 12/2016 | Logue ................... H04W 8/005 |

FOREIGN PATENT DOCUMENTS

| | | |
|---|---|---|
| JP | 2002-534907 | 10/2002 |
| JP | 2006-005775 | 1/2006 |
| JP | 2009-159192 | 7/2009 |
| JP | 2009-278256 | 11/2009 |
| WO | 2011/162650 | 12/2011 |

OTHER PUBLICATIONS

Go Hasegawa, "Research Trends on TCP Congestion Control Mechanisms", The Transactions of the Institute of Electronics, Information and Communication Engineers, May 1, 2011 (May 1, 2011), vol. J94-B, pp. 663-672.

Cheng Jin, David X. Wei and Steven H. Low, "Fast TCP: Motivation, Architecture, Algorithms, Performance", in Proc. of IEEE INFOCOM, Hong Kong, Mar. 2004.

Lawrence S. Brakmo, Sean W. O'Malley, and Larry L Peterson, "TCP Vegas: New Techniques for Congestion Detection and Avoidance", Computer Communication Review, vol. 24, No. 4, pp. 24-35, Oct. 1994.

Extended European Search Report for Application No. 13864681 dated Jun. 21, 2016.

Japanese Office Action dated Sep. 26, 2017 in corresponding Japanese Patent Application No. 2014-553162 with JPO machine translation of Japanese Office Action.

* cited by examiner

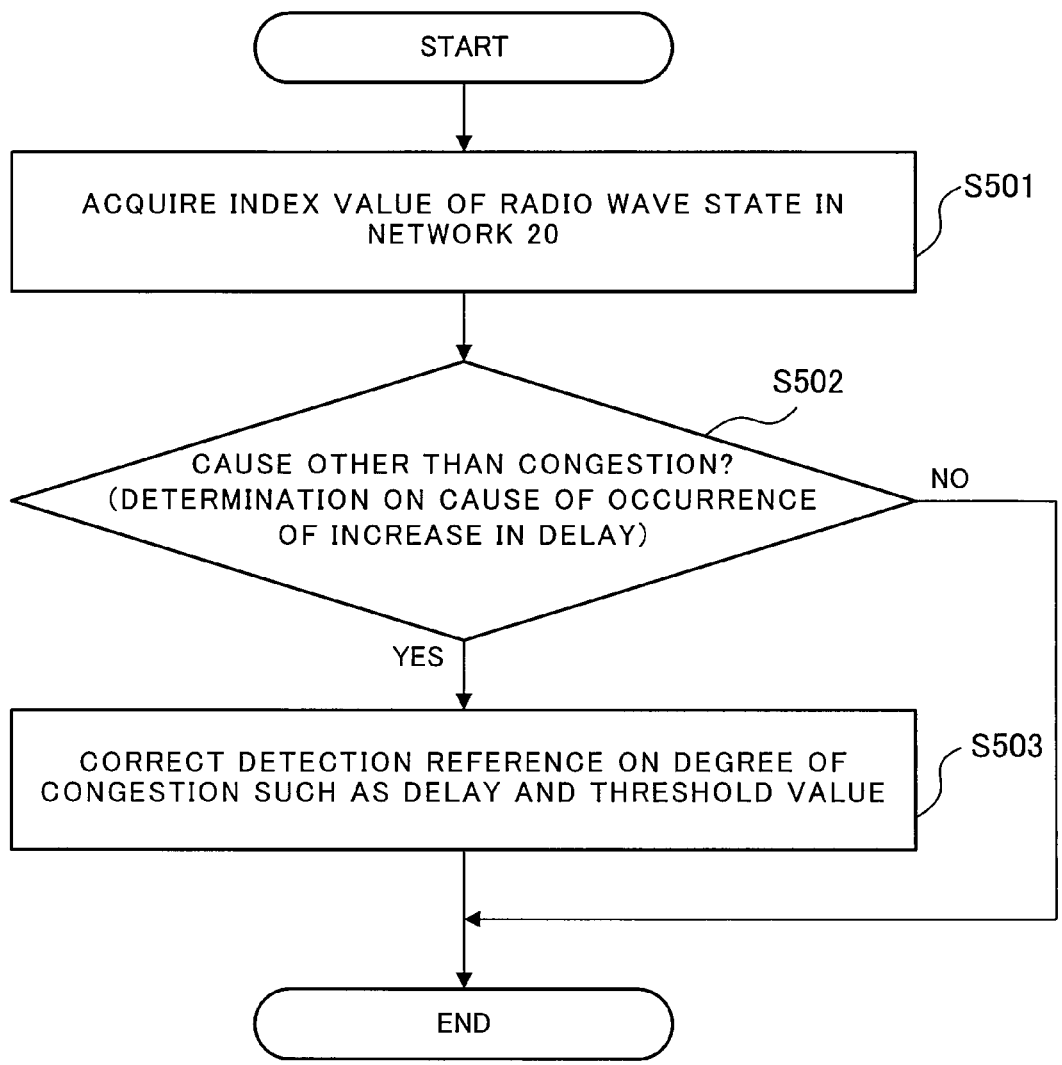

DATA TRANSMISSION DEVICE, DATA TRANSMISSION METHOD, AND PROGRAM THEREFOR

TECHNICAL FIELD

The present invention relates to a network technique, and particularly, to a data transmission device, a data transmission method, and a program therefor, which realize significant traffic control.

BACKGROUND ART

In recent years, as the line capacity of the Internet has increased and the element technique of handling versatile media information has been provided, people have come to enjoy information delivery by rich media from mobile terminals at any time anywhere. Such a lifestyle has been widely penetrated, and as a high-speed mobile environment for supporting the information delivery, a communication environment such as LTE (Long Term Evolution) and the like is being spread and expanded.

In the high-speed mobile communication environment such as LTE and the like, a variety of techniques for enhancing data communication efficiency are introduced in a protocol of each layer. For example, in an RLC (Radio Link Control) layer in LTE, in order to reduce redundant fragments and overheads, the transmitter divides and links data transferred from an upper layer, and the receiver restores the data by performing sequence control and transfers the data to the upper layer so as to use up each service data unit.

Further, in a MAC (Media Access Control) layer in LTE or in HSDPA (High Speed Downlink Packet Access), an HARQ (Hybrid Automatic Repeat reQuest) technique of efficiently correcting a communication data error is introduced by making data redundant in advance in a wireless network in which a bit error is likely to occur, and by re-transmitting the redundant portion by one-eighth each when a bit error occurs. According to the HARQ technique, it is possible to complete data re-transmission and restoration processing in the MAC layer or lower, and to reduce an amount of data to be re-transmitted, and thus, it is possible to realize effective use of a wireless band.

According to the data dividing and linking processing in the high-speed mobile communication environment or the HARQ technique, described above, it is possible to virtually provide a network with less overheads and errors in terms of a protocol of an upper layer (it is possible to simultaneously reduce an error in terms of a protocol of an upper layer).

However, since a content of the technique is that a bit error is restored by re-transmission, there is a problem that delay occurs in terms of a protocol of an upper layer.

Further, in TCP (Transmission Control Protocol) conventionally and widely used in both of wired and wireless data communication, a technique for congestion control has been advanced in order to cope with a recent communication environment in which many pieces of traffic co-exist.

In association with the above, in delay-based TCP as represented by TCP Vegas (NPL 1) and FAST TCP (NPL 2), it is possible to suppress a data transmission rate before a packet loss occurs by detecting congestion through analysis of a situation regarding increase in delay. This makes it possible to stabilize throughput while escaping failure of a network.

However, in delay-based TCP disclosed in NPL 1 or NPL 2 described above, when a product of an available bandwidth and an amount of increase in delay exceeds a predetermined threshold value, due to determining that the network is in a congestion state, and performing control that a data transmission rate is lowered, a problem occurs that a transmission rate is unnecessarily lowered by recognizing by mistake that congestion occurs even when the increase in delay is not caused by congestion.

As a related technique in view of the aforementioned problem, for example, the following contents of techniques (PTL 1 or PTL 2) are known.

PTL 1 discloses a content of a technique, in which, when a burst-type packet loss occurs during streaming, it is determined that the packet loss is caused by a link failure (a failure such as cutoff of a communication link by breaking of an optical fiber or the like) or a node failure (a failure due to breakdown of equipment such as a router, abnormality of a router configuration, or the like), and a stream transmission rate is maintained by using stored network statistical information in the past, in place of the current network statistical information.

PTL 2 discloses a content of a technique, in which, it is determined whether or not to be in a congestion state and whether or not to be a transmission error by analysis of feedback data, and when both being in a congestion state and being a transmission error are determined, it is judged that congestion does not occur, and delivery is continued without changing the transfer rate.

CITATION LIST

Non Patent Literature

NPL 1: L. S. Brakmo, S. O'Malley, and L. L. Peterson, "TCP Vegas: New Techniques for Congestion Detection and Avoidance," Computer Communication Review, vol. 24, no. 4, pp. 24-35, October 1994.

NPL 2: C. Jin, D. Wei, and S. Low, "FAST TCP: Motivation, Architecture, Algorithms, Performance," in Proc. of IEEE INFOCOM, Hong Kong, March 2004.

Patent Literature

PTL 1: Japanese Laid-open Patent Publication No. 2006-5775.

PTL 2: Japanese Laid-open Patent Publication No. 2001-160824.

Technical Problem

In the contents of techniques disclosed in PTL 1 and PTL 2, however, based on the premise that an easily understandable phenomenon such as a packet loss and a transmission error is observed, it is determined whether or not congestion occurs by utilizing a rate of occurrence of these phenomena, therefore, there is a problem that precision of determining congestion is lowered in a communication environment such as LTE, in which a transmission error is restored in a lower layer, and a packet loss and the like is difficult to be found from an upper layer.

OBJECT OF INVENTION

An object of the invention is to improve the problem of the aforementioned conventional and related examples, and in particular, to provide a data transmission device, a data transmission method, and a program therefor, that effectively enhance throughput (transmission efficiency) even when increase in delay due to a cause other than congestion occurs in a network.

Solution to Problem

In order to accomplish the above object, a data transmission device according to the present invention is a data transmission device provided with a transmission unit for transmitting data to a user terminal, including a transmission operation control unit having a determination function of determining whether or not increase in delay in data transmission is caused by network congestion, based on a predetermined reference, and a transmission rate control function of controlling an operation of the transmission unit so as not to lower a transmission rate when it is determined by the determination function that the increase in delay is not caused by congestion.

Further, a data transmission method according to the present invention is a data transmission method in a data transmission device provided with a transmission unit for transmitting data to a user terminal, including: determining whether or not increase in delay in data transmission is caused by network congestion, based on a predetermined reference; correcting a predetermined detection reference when it is determined that the increase in delay is not caused by congestion; detecting a degree of congestion based on the corrected detection reference; and controlling an operation of the transmission unit so as not to lower a transmission rate in accordance with a result of the detection.

Furthermore, a data transmission program according to the present invention is a data transmission program that causes a computer to execute, in a data transmission device provided with a transmission unit for transmitting data to a user terminal: a delay cause determination function of determining whether or not increase in delay in data transmission is caused by network congestion, based on a predetermined reference; a detection reference correction function of correcting a predetermined detection reference when it is determined that the increase in delay is not caused by congestion by the delay cause determination function; a congestion detection function of detecting a degree of congestion based on the detection reference corrected by the detection reference correction function; and a transmission rate control function of controlling an operation of the transmission unit so as not to lower a transmission rate in accordance with a result of the detection by the congestion detection function.

Advantageous Effects of Invention

According to the present invention, it is possible to provide a data transmission device, a data transmission method, and a program therefor, which enable to effectively enhance throughput (transmission efficiency) particularly when increase in delay due to a cause other than congestion occurs in a network.

BRIEF DESCRIPTION OF DRAWINGS

FIG. 5 is a flowchart illustrating an operation from a network delay measurement processing to determination on a cause of increase in delay and correction of a congestion parameter based on the determination, to be performed by the data transmission device disclosed in FIG. 4.

DESCRIPTION OF EMBODIMENTS

First Exemplary Embodiment

Figure 1:
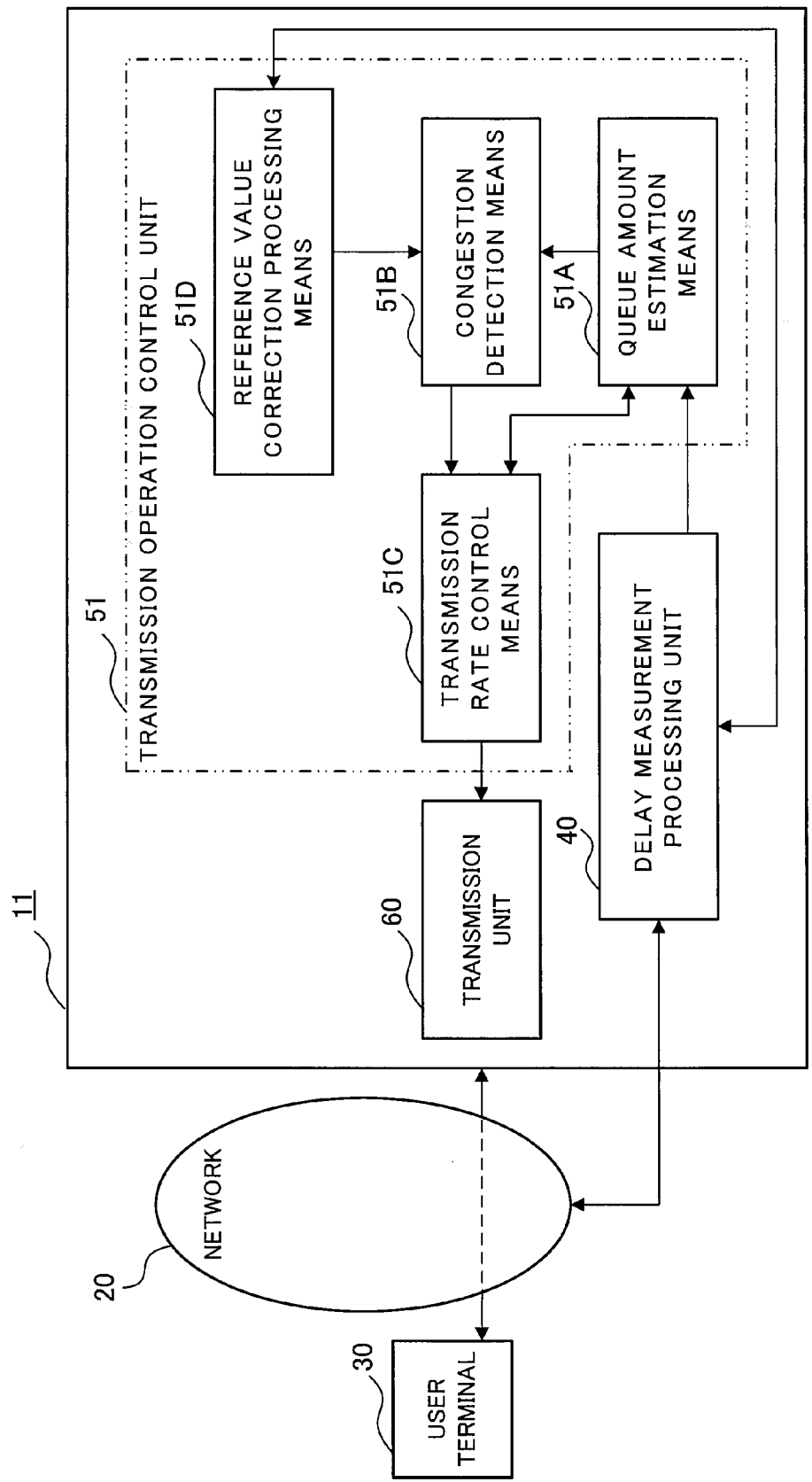
FIG. 1 is a block diagram illustrating a configuration of a data transmission device and a peripheral environment thereof according to a first exemplary embodiment of the present invention.
Figure 2:
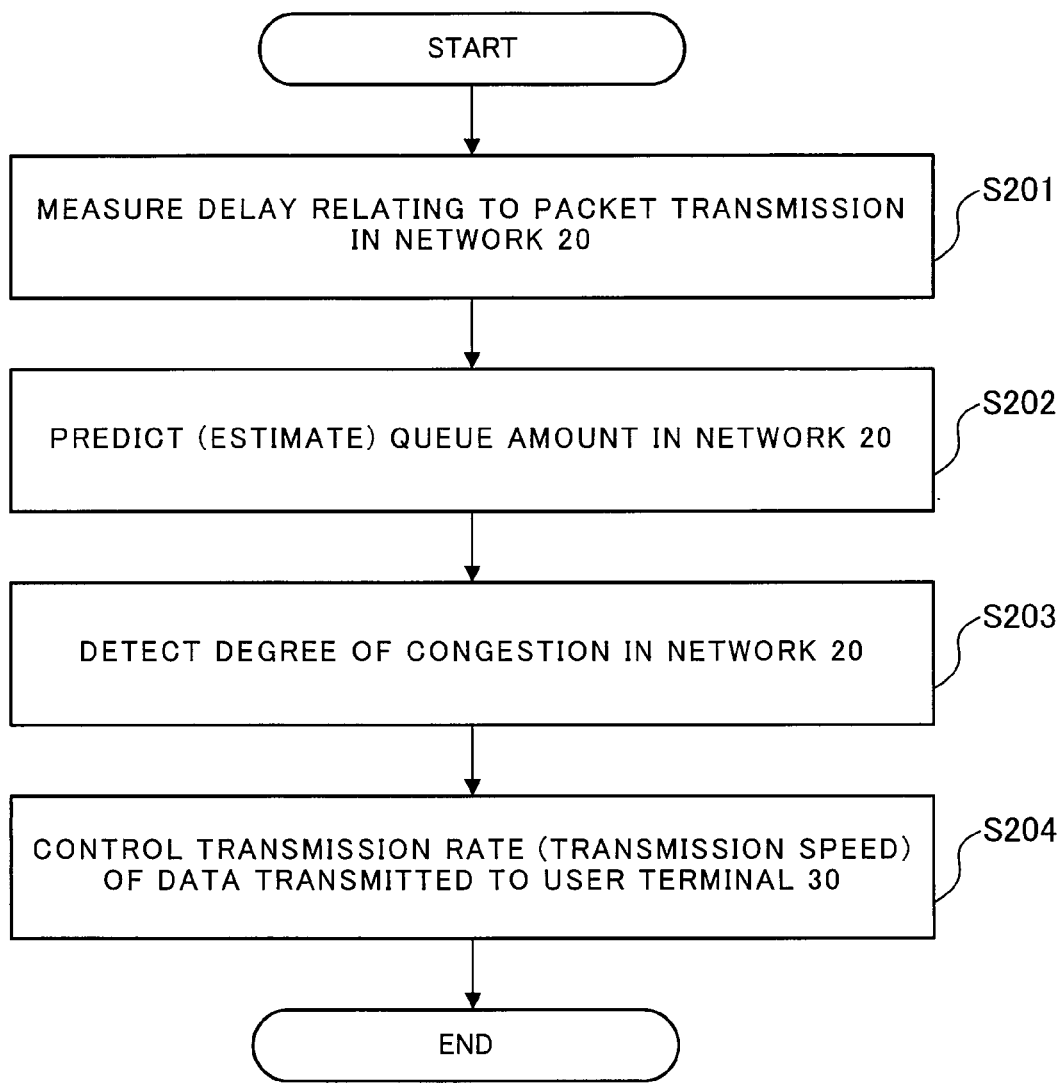
FIG. 2 is a flowchart illustrating an operation from network delay measurement processing to data transmission rate control, to be performed by the data transmission device disclosed in FIG. 1.

A data transmission device according to a first exemplary embodiment of the present invention is described based on FIGS. 1 and 2.

(Basic Configuration)

First, a basic configuration of the data transmission device and a peripheral environment thereof according to the first exemplary embodiment are described based on FIG. 1.

As shown in FIG. 1, a data transmission device 11 for performing data transmission in response to an external request is connected to a network 20 such as the Internet. The reference sign 30 denotes a user terminal (a request source terminal) that transmits a data acquisition request from a user or the like to the data transmission device 11 via the network 20 for acquiring data associated with the request, and corresponds to a PC (Personal Computer), a mobile terminal, and the like. Namely, the network 20 functions as a component for connecting the user terminal 30 and the data transmission device 11.

As the data transmission device 11, for example, an origin server that holds data requested from a user, a relay service device that is disposed in the network 20 and temporarily terminates data communication between the origin server and the user terminal 30, such as a cache server, a proxy server, and an edge server, data communication equipment constituting the network 20, such as a P-GW (Packet Data Network Gateway) and an S-GW (Serving Gateway), and the like can be adopted, and in any case, it is configured to establish a connection in TCP or the like with respect to the user terminal 30 and transmit requested data.

At this point, when a relay server device or the like is adopted as the data transmission device 11, an origin server may be configured to be disposed on a path along which data is transmitted to the user terminal 30, or, another network (not shown) or an origin server or the like (not shown) that holds requested data may be provided behind the data transmission device 11 in terms of the user terminal 30.

Namely, when data acquisition is requested from a user or the like, the user terminal 30 is configured to transmit the data request to the data transmission device 11 or to the origin server via the network 20, and in response to the data request, the data transmission device 11 or the origin server is configured to deliver data associated with the request to the user terminal 30. The user terminal 30 is configured to present the data to a user or the like when the data is delivered.

Further, the data transmission device 11 including a transmission unit 60 for transmitting data to the user terminal 30 includes a transmission operation control unit 51 that has a determination function of determining whether or not increase in delay in data transmission is caused by network congestion, based on a predetermined reference, and a transmission rate control function of controlling an operation of the transmission unit 60 so as not to lower the transmission rate when it is determined that the increase in delay is not caused by congestion, by the determination function.

Accordingly, since the transmission operation control unit 51, determining that delay increases due to a cause other than congestion by analyzing the delay and the like in data transmission, adjusts the transmission rate so as to control an operation of the transmission unit 60, this makes it possible to prevent a problem lowering the transmission rate when delay increases due to a cause other than congestion, and thus, it is possible to enhance the throughput.

(Specific Configuration)

Subsequently, a specific configuration of the data transmission device and a peripheral environment thereof according to the first exemplary embodiment are described based on FIG. 1.

As shown in FIG. 1, the data transmission device 11 for transmitting requested data to the user terminal 30 via the network 20 includes: a delay measurement processing unit 40 that measures delay in packet transmission in the network 20 and that stores, in an internal memory or the like (not shown), the measurement value (delay) or a statistical value or the like obtained by applying statistical processing to the measurement value, and network information; the transmission operation control unit 51 that determines whether or not increase in the delay stored in the delay measurement processing unit 40 is caused by network congestion, and controls not to lower the transmission rate when it is determined that the increase in delay is not caused by congestion; and the transmission unit 60 that transmits data to the user terminal 30 in accordance with a predetermined transmission rate.

The aforementioned network information includes a transmission time of each packet, a data size of transmission data, a transmission time of an acknowledgement response packet from the user terminal 30 (a time when an acknowledge response packet is transmitted), a time when an acknowledgement response packet is received, a data size of an acknowledgement response packet, an available bandwidth of the network 20, and transmission throughput, and the delay measurement processing unit 40 is configured to acquire necessary information among the network information, and to store the necessary information when the aforementioned measurement is performed.

The acknowledgement response packet above is a so-called ACK (positive acknowledgement) packet, and hereinafter, the acknowledgement response packet is simply referred to as an acknowledgement response.

Further, delay or a statistical value or the like obtained by applying statistical processing to the delay, and the aforementioned network information, stored in the aforementioned delay measurement processing unit 40, are referred to as delay data.

The delay measurement processing unit 40 is configured to measure delay required for transmitting/receiving a packet in the network 20 and acquire the delay data when the data transmission device 11 receives an acknowledgement response of data (a data packet) transmitted to the user terminal 30 or at a fixed time interval.

As the delay, for example, a one-way delay from the data transmission device 11 to the user terminal 30 and the like, in addition to an RTT (Round Trip Time) of communication between the user terminal 30 and the data transmission device 11, and a round-trip delay, can be adopted.

Besides, as a delay measurement method to be performed by the delay measurement processing unit 40, a method of deriving an estimation value by a well-known method, such as a method in which network information is measured using transmission data, and a method in which a search packet is transmitted for measurement independently of transmission data, may be adopted. It is needless to say that any measurement method other than the aforementioned measurement method may be adopted.

The transmission operation control unit 51 includes: queue amount estimation means 51A that predicts (estimates) a queue amount representing an amount of packets staying in the network 20 when measurement is performed, based on delay to be measured by the delay measurement unit 40 or the like; congestion detection means 51B that detects (determines) a degree of congestion in the network 20 by comparing the queue amount estimated by the queue amount estimation means 51A with a predetermined threshold value (a threshold value used to control the transmission unit); transmission rate control means 51C that controls the transmission rate of data to be transmitted to the user terminal 30 depending on the degree of congestion detected by the congestion detection means 51B; and reference value correction processing means 51D that detects increase in delay by analyzing the delay and the network information stored in the delay measurement processing unit 40, determines a cause of occurrence of the increase in delay, and performs correction on the aforementioned threshold value and the like based on a result of the determination.

The queue amount estimation means 51A is configured to estimate a queue amount representing an amount of packets staying in the network 20, based on delay measured by the delay measurement processing unit 40, a transmission rate set by the transmission rate control means 51C when the delay measurement processing unit 40 measures the delay or at a predetermined fixed time interval. At this point, the queue amount estimation means 51A is configured to use delay measured by the delay measurement processing unit 40 immediately before the estimation processing when the queue amount is estimated at the fixed time interval.

In the first exemplary embodiment, as a queue amount estimation method to be performed by the queue amount estimation means 51A, a method of calculating the queue amount (q) by Eq. 1, using delay (d) measured by the delay measurement processing unit 40, a minimum value (d_min) of delay during a fixed time or during the same transmission session, and an actual data transmission throughput (bw), is adopted.

(Eq. 1)

$$q = bw \times (d - d\_\min) \qquad (1)$$

Alternatively, the estimation method is not limited to the aforementioned estimation method by Eq. 1, but, for example, an estimation method in which a current transmission rate (cw) set by the transmission rate control means 51C is used in place of the transmission throughput (bw), or an estimation method, in which delay (d) is used in place of the term (d−d_min) in Eq. 1, may be adopted.

The congestion detection means 51B is configured to detect a degree of congestion in the network 20, based on the queue amount estimated by the queue amount estimation means 51A, when the queue amount is estimated by the queue amount estimation means 51A or at a predetermined fixed time interval. At this point, the congestion detection means 51B is configured to use the queue amount estimated by the queue amount estimation means 51A immediately before the detection processing, when the degree of congestion is detected at the aforementioned fixed time interval, In the first exemplary embodiment, as a congestion detection method to be performed by the congestion detection means 51B, a method to detect being in a congestion state when the queue amount (q) estimated by the queue amount estimation means 51A exceeds a predetermined threshold value (th) is adopted.

In addition, a method, in which a plurality of threshold values are set in advance, and a degree of congestion is detected by determining which threshold value range the queue amount (q) estimated in real time belongs to (a method of detecting a degree of congestion in a stepwise manner), may be adopted. Further, a method, in which a degree of congestion (cn) is calculated and detected by "cn=f(q)" as a function of the queue amount (q) estimated in real time, may be adopted.

The transmission rate control means 51C is configured to control a transmission rate (a transmission speed) of data being transmitted to the user terminal 30, based on the degree of congestion detected by the congestion detection means 51B, when the degree of congestion is detected by the congestion detection means 51B or at a predetermined fixed time interval. At this point, the transmission rate control means 51C is configured to use the degree of congestion detected by the congestion detection means 51B immediately before the transmission rate control is started, when the transmission rate is controlled at the aforementioned fixed time interval.

In the first exemplary embodiment, as a transmission speed control method to be performed by the transmission rate control means 51C, a method, in which the transmission rate (cw) is lowered by a predetermined value when the congestion detection means 51B detects being in a congestion state, while the transmission rate (cw) is increased by a predetermined value when the congestion detection means 51B detects not being in a congestion state, is adopted.

Further, a method including, in addition to the aforementioned control method, control of keeping the transmission rate (cw) unchanged depending on the degree of congestion, may be adopted. Namely, as described above, a method, in which an amount of change in the transmission rate (cw) is changed with every degree of congestion, when the congestion detection means 51B detects congestion in a stepwise manner based on a plurality of predetermined threshold values, may be adopted.

However, a control method, in which the transmission rate (cw) is controlled to be lowered only when the congestion detection means 51B detects being in a congestion state, and the transmission rate (cw) is kept unchanged when the congestion detection means 51B detects not being in a congestion state, may be adopted.

Further, in the aforementioned control method, a control method, in which a predetermined ratio is used, in place of a predetermined value to be used in increasing or decreasing the transmission rate (cw), may be adopted. Furthermore, a method, in which a new transmission rate (cw) is calculated, based on, for example, the current transmission rate (cw), the actual data transmission throughput (bw), and the degree of congestion (cn) detected by the congestion detection means 51B, may be adopted.

The reference value correction processing means 51D is configured to obtain a delay change pattern by analyzing the delay data stored in the delay measurement processing unit 40 when the delay measurement processing unit 40 measures the delay or at a fixed time interval. Further, the reference value correction processing means 51D is configured to detect increase in delay by comparing the delay change pattern with a delay change pattern specified in advance, and to determine a cause of occurrence of the increase in delay (determine whether the increase in delay is caused by congestion, or due to a cause other than congestion, such as a bit error in the network 20).

As the determination processing performed by the reference value correction processing means 51D, a method, in which it is determined that the increase in delay is due to a cause other than congestion in the network 20 (delay increases due to a cause other than congestion) when it is possible to observe or estimate a phenomenon that a packet arrival interval to the user terminal 30 is extremely short, is adopted. Namely, in the first exemplary embodiment, a phenomenon that a packet arrival interval to the user terminal 30 is extremely short is adopted as the aforementioned delay change pattern specified in advance.

Specifically, the reference value correction processing means 51D is configured to determine that delay increases due to a cause other than congestion, when being able to obtain: a pattern (a phenomenon) that delay of each packet (sharply increases, and then) substantially linearly decreases with respect to increase in a transmission time of the packet when the transmission time of each packet is compared with delay of the packet; a pattern that a time interval at which the user terminal 30 transmits an acknowledgement response is very small; a pattern that "a time interval at which the data transmission device 11 receives an acknowledgment response from the user terminal 30" is smaller than "a value obtained by dividing a data size of the acknowledgement response by the actual data transmission throughput (bw)"; a pattern that "a time interval of a transmission time of an acknowledgement response" is smaller than "a value obtained by dividing a data size of transmission data by an available bandwidth of the network 20"; or a pattern that "a time interval at which an acknowledgement response is received" is smaller than "a value obtained by dividing a data size of transmission data by an available bandwidth of the network 20".

Further, the reference value correction processing means 51D is configured to temporarily correct a parameter (a congestion parameter) affecting detection of a degree of congestion to be performed by the congestion detection means 51B when it is determined that delay increases due to a cause other than congestion. The congestion parameter indicates delay to be measured by the delay measurement processing unit 40, a threshold value to be used in detecting a degree of congestion by the congestion detection means 51B (a threshold value to be used in control of the transmission unit 60), and a degree of congestion (cn).

In the first exemplary embodiment, as the aforementioned correction method to be performed by the reference value correction processing means 51D, a method, in which the threshold value (th) used by the congestion detection means 51B is (temporarily) increased for a fixed time, is adopted.

Alternatively, as the aforementioned correction method, for example, a method of decreasing the degree of congestion (cn) used by the congestion detection means 51B for a fixed time, a method of decreasing the delay (d) measured by the delay measurement processing unit 40 for a fixed time, or a method of temporarily using the past delay (d) stored immediately before, in place of a delay (d) newly measured by the delay measurement processing unit 40 may be adopted.

Further, not only either correction of temporarily decreasing the delay (d) measured by the delay measurement processing unit 40, or correction of temporarily increasing a threshold value to be used in detecting a degree of congestion, but also a correction method combining both types of correction may be adopted.

Since each type of the aforementioned correction aims to perform control so as not to lower the transmission rate of data transmitted to the user terminal 30, a correction value for each type of the correction is set in advance in order to realize the control, in the first exemplary embodiment.

As described above, the congestion detection means 51B is capable of performing the aforementioned detection processing using an adjusted congestion parameter by causing the reference value correction processing means 51D to correct either one or both of the delay to be measured by the delay measurement processing unit 40 and the threshold value to be used in detecting a degree of congestion (a threshold value in control of the transmission unit 60), therefore, this makes it possible to prevent erroneous detection of congestion by the congestion detection means 51B, and as a result, excessive lowering control of the transmission rate by the transmission rate control means 51C can be prevented.

The data transmission device 11 is configured to acquire a data request message from the user terminal 30 via the network 20, and to transmit data associated with the request to the user terminal 30 at a transmission rate set by the transmission rate control means 51C in response to the data request message.

At this point, when an origin server is adopted as the data transmission device 11, it is possible to transmit data at a set transmission rate since the origin server itself holds all original data.

Besides, when a relay server device or data communication equipment is adopted as the data transmission device 11, it is possible to transmit data at a set transmission rate without depending on throughput of the network between the origin server and the data transmission device 11 (a data amount processable within a fixed time) by duplicating original data as cache in advance in a storage area of its own device, or by temporarily storing data stream transmitted from the origin server in a storage area of its own device used as a buffer.

Further, as a method for acquiring a data request message from the user terminal 30 when a relay server device or data communication equipment is adopted as the data transmission device 11, for example, a method, in which a router or the like disposed on a path from the user terminal 30 to the origin server and connected to the data transmission device 11 transfers, for example, the request message transmitted from the user terminal 30 to the origin server, to the data transmission device 11, in place of the origin server, based on a condition such as header information of the request message, may be adopted.

Besides, the acquisition method is not limited to the aforementioned acquisition method, but, for example, a method, in which the user terminal 30 explicitly designates the data transmission device 11 as a proxy (proxy server) so as to transmit a data request message, may be adopted. Alternatively, a method, in which, when address resolution about a destination is performed by a DNS (Domain Name System) or the like in order to transmit a data request message from the user terminal 30 to the origin server, the DNS or the like replies an address of the data transmission device 11 in place of the origin server, may be adopted.

(Description of Operation)

Subsequently, an operation of the data transmission device 11 shown in FIG. 1 is described based on flowcharts shown in FIGS. 2 and 3. First, an operation of the data transmission device 11 from network delay measurement processing to data transmission rate control is described referring to FIGS. 1 and 2.

When the data transmission device 11 receives an acknowledgement response of data (a data packet) transmitted to the user terminal 30, the delay measurement processing unit 40 measures delay required for transmitting/receiving a packet in the network 20, and stores the acquired delay data in an internal memory or the like (not shown) (Step S201 in FIG. 2).

Next, when the delay measurement processing unit 40 measures delay, the queue amount estimation means 51A estimates a queue amount representing an amount of packets staying in the network 20, based on the delay measured by the delay measurement processing unit 40, the transmission rate set by the transmission rate control means 51C, and the like. In the first exemplary embodiment, the queue amount estimation means 51A estimates the queue amount based on Eq. 1 described above (Step S202 in FIG. 2).

Subsequently, when the queue amount estimation means 51A estimates the queue amount, the congestion detection means 51B detects a degree of congestion in the network 20, based on the estimated queue amount (Step S203 in FIG. 2).

In the first exemplary embodiment, the congestion detection means 51B detects being in a congestion state when the queue amount estimated in real time exceeds a predetermined threshold value. On the other hand, the congestion detection means 51B detects not being in a congestion state when the queue amount estimated in real time does not exceed the predetermined threshold value (Step S203 in FIG. 2).

When the congestion detection means 51B detects a degree of congestion, the transmission rate control means 51C controls the transmission rate (a transmission speed) of data being transmitted to the user terminal 30, based on the degree of congestion detected by the congestion detection means 51B (Step S204 in FIG. 2).

In the first exemplary embodiment, when the congestion detection means 51B detects being in a congestion state, the transmission rate control means 51C lowers the transmission rate by a predetermined value. On the other hand, when the congestion detection means 51B detects not being in a congestion state, the transmission rate control means 51C increases the transmission rate by a predetermined value (Step S204 in FIG. 2).

Subsequently, an operation from the network delay measurement processing to determination on a cause of occurrence of increase in delay and correction of a congestion parameter (a detection reference on a degree of congestion) accompanied by the determination is described referring to FIGS. 1 and 3.

Figure 3:
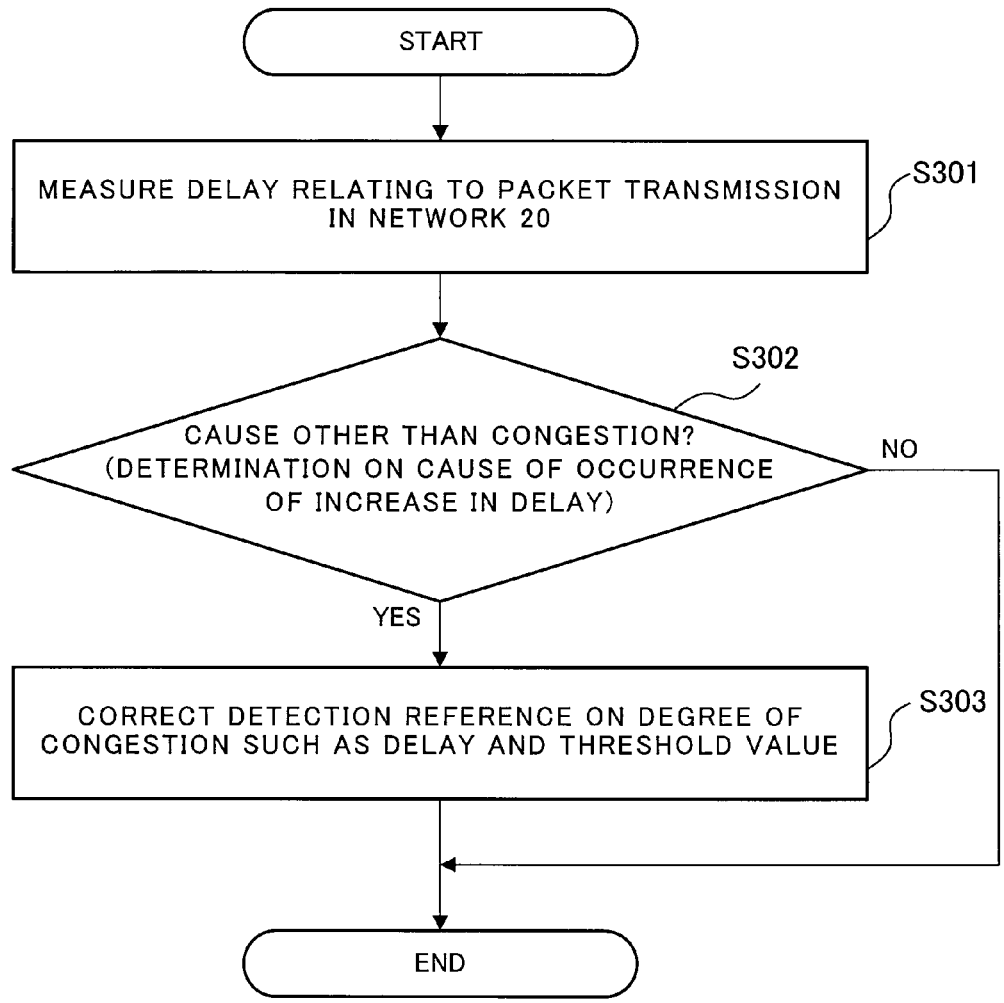
FIG. 3 is a flowchart illustrating an operation from the network delay measurement processing to determination on a cause of increase in delay and correction of a congestion parameter based on the determination, to be performed by the data transmission device disclosed in FIG. 1.

First, when the data transmission device 11 receives an acknowledgement response of data (a data packet) transmitted to the user terminal 30, the delay measurement processing unit 40 measures delay of packet transmission in the network 20, and stores the acquired delay data in an internal memory or the like (not shown) (Step S301 in FIG. 3).

Next, when the delay measurement processing unit 40 measures delay, the reference value correction processing means 51D determines a cause of occurrence of the increase in delay, based on a delay change pattern obtained by analyzing the delay data stored in the delay measurement processing unit 40. Specifically, the reference value correction processing means 51D determines that the delay increases due to a cause other than congestion when a pattern equal to a change pattern specified in advance for the delay is obtained (Step S302 in FIG. 3).

Subsequently, when determining that the delay increases due to a cause other than congestion (YES in Step S302 in FIG. 3), the reference value correction processing means 51D corrects the delay measured by the delay measurement processing unit 40 or a threshold value to be used in detecting a degree of congestion by the congestion detection means 51B (Step S303 in FIG. 3). Then, determination processing with respect to a succeeding data packet is performed.

On the other hand, when determining that the increase in delay is caused by congestion in the network 20 (the delay increases due to congestion) (NO in Step S302 in FIG. 3), the reference value correction processing means 51D performs determination processing with respect to a succeeding data packet, without correcting the aforementioned threshold value.

At this point, the aforementioned delay measurement processing performed by the delay measurement processing unit 40 (Step S201 in FIG. 2) may be performed at a predetermined fixed time interval.

Likewise, the queue amount estimation processing performed by the queue amount estimation means 51A (Step S202 in FIG. 2) may be performed at a predetermined fixed time interval. In this case, the queue amount estimation means 51A uses the delay measured and stored by the delay measurement processing unit 40 immediately before the estimation processing.

Identically, the detection of a degree of congestion performed by the congestion detection means 51B (Step S203 in FIG. 2) may be performed at a predetermined fixed time interval. In this case, the congestion detection means 51B uses the queue amount obtained by the queue amount estimation means 51A in estimation processing immediately before the recognition.

Likewise, the transmission rate control performed by the transmission rate control means 51C (Step S204 in FIG. 2) may be performed at a predetermined fixed time interval. In this case, the transmission rate control means 51C uses information of a degree of congestion detected by the congestion detection means 51B immediately before the transmission rate control.

Further, the delay measurement processing performed by the delay measurement processing unit 40 (Step S301 in FIG. 3) may be performed at a predetermined fixed time interval.

Likewise, the determination on a cause of occurrence of the increase in delay performed by the reference value correction processing means 51D (Step S302 in FIG. 3) may be performed at a predetermined fixed time interval. In this case, the reference value correction processing means 51D uses the delay data obtained by the delay measurement processing unit 40 in measurement processing performed immediately before the determination.

Further, an execution content of each process in Steps S201 to S204 (in FIG. 2) and Steps S301 to S303 (in FIG. 3) described above may be programmed, and a series of the respective control programs may be configured to be implemented by a computer.

Advantageous Effects of First Exemplary Embodiment

As described above, in the data transmission device 11 according to the first exemplary embodiment, since a configuration is adopted, in which, when determining that delay increases due to a cause other than congestion, the reference value correction processing means 51D temporarily corrects the threshold value or the like to be referred to when the congestion detection means 51B detects a degree of congestion in the network 20, unnecessary lowering of the transmission rate by the transmission rate control means 51C can be prevented when delay increases due to a cause other than congestion, and thus, this make it possible to enhance the throughput.

Namely, according to the data transmission device 11, since it is possible to realize significant traffic control, erroneous detection of congestion can be prevented, and thus, this make it possible to enhance transmission efficiency.

Second Exemplary Embodiment

Figure 4:
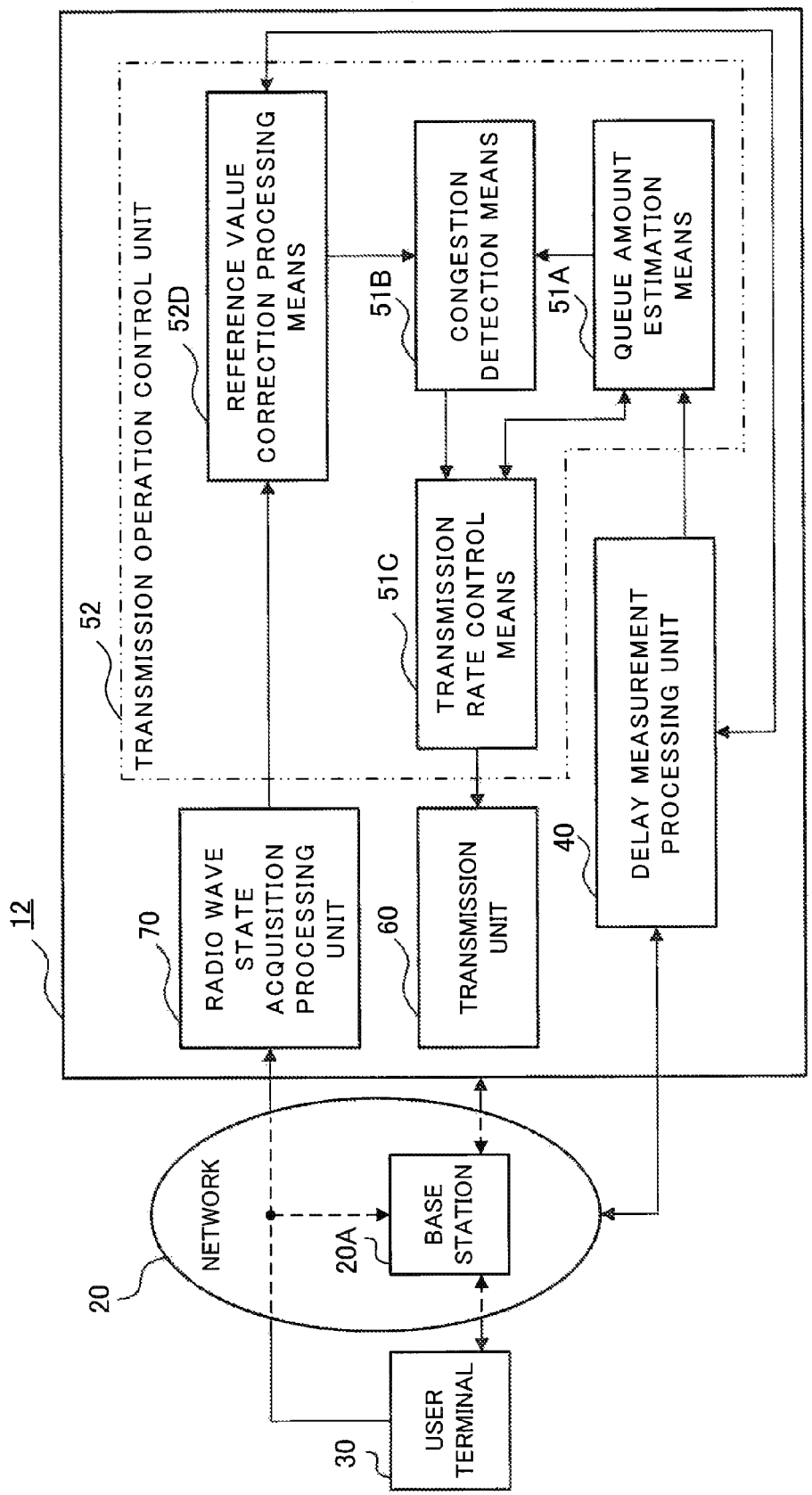
FIG. 4 is a block diagram illustrating a configuration of a data transmission device and a peripheral environment thereof according to a second exemplary embodiment of the present invention.

Next, a data transmission device according to a second exemplary embodiment of the present invention is described, based on FIGS. 4 and 5. Herein, the same constituent members as the first exemplary embodiment described above use the same reference signs.

(Overall Configuration)

Herein, a point different from contents of the configuration of the first exemplary embodiment described above is described based on FIG. 4.

In the second exemplary embodiment, a network 20 is configured to include a base station 20A that measures a radio wave state, such as intensity of a radio wave and a bit error, in a wireless portion of the network 20, or receives a radio wave from a user terminal 30. Namely, the base station 20A is data communication equipment constituting the network 20, such as an eNodeB (LTE wireless base station).

A data transmission device 12 for performing data transmission processing in response to a request from the user terminal 30 includes a radio wave state acquisition processing unit 70 that acquires an index value (an index) of a radio wave state in a wireless portion of the network 20 from the user terminal 30 or the base station 20A at a fixed time interval, in addition to the respective constituent members of the data transmission device 11 according to the first exemplary embodiment described above (the delay measurement processing unit 40, the queue amount estimation means 51A, the congestion detection means 51B, the transmission rate control means 51C, and the transmission unit 60 in FIG. 2). Further, the data transmission device 12 is configured to include a transmission operation control unit 52 including reference value correction processing means 52D having the same function as the reference value correction processing means 51D (in FIG. 2), in place thereof.

Namely, the reference value correction processing means 52D includes a characteristic functional configuration to perform determination on a cause of occurrence of increase in delay, based on an index value of a radio wave state acquired and stored in an internal memory or the like (not shown) by the radio wave state acquisition processing unit 70, in addition to the functional configuration included in the reference value correction processing means 51D (in FIG. 2) according to the first exemplary embodiment described above.

At this point, in the second exemplary embodiment, the radio wave state acquisition processing unit 70 is configured to acquire an index of SINR (Signal to Interference plus Noise Ratio) measured by the user terminal 30, as an index value of a radio wave state. The SINR is an index representing a ratio of signal intensity to noise or interference, and as the index increases, the signal intensity increases, and a bit error is less likely to occur.

Further, the radio wave state acquisition processing unit 70 may be configured to acquire an index of a radio wave state such as CQI (Channel Quality Indicator), RSSI (Received Signal Strength Indicator), and ASU (Arbitrary Strength Unit), in place of the aforementioned index of SINR.

The aforementioned CQI is an index proportional to SINR, and represents quality of a radio channel. As the value of CQI is larger, it is indicated that the quality is better (an error is less likely).

The aforementioned RSSI and ASU are indexes representing intensity of a signal received on the side of the user terminal 30, and are indexes reflecting the number of antennas on a mobile phone. Both of the values have a feature so that, as the values are larger, receiving sensitivity is better (an error is less likely to occur).

Each of the aforementioned indexes represents intensity of a signal or a level of quality, and has correlation so that, as the value is larger, an error is less likely to occur. Here, the radio wave state acquisition processing unit 70 may be configured to acquire an index so that, as the index value is smaller, an error is less likely to occur.

Further, the reference value correction processing means 52D is configured to perform the aforementioned determination on a cause of occurrence of increase in delay, when the radio wave state acquisition processing unit 70 acquires an index value of a radio wave state or at a predetermined fixed time interval.

Herein, the reference value correction processing means 52D is configured to utilize an index value of a radio wave state, acquired by the radio wave state acquisition processing unit 70 immediately before the determination, when the determination is performed at the aforementioned fixed time interval.

Herein, as a method for determining a cause of occurrence of increase in delay performed by the reference value correction processing means 52D based on an index value of a radio wave state, for example, a method, in which it is determined that delay increases due to a cause other than congestion when the index value of the radio wave state is larger or smaller than a predetermined set value (threshold value), may be adopted.

In the second exemplary embodiment, the reference value correction processing means 52D is configured to determine that delay increases due to a cause other than congestion, when the index value of the radio wave state acquired by the radio wave state acquisition processing unit 70 is smaller than a predetermined set value.

Further, use of an index value of a radio wave state acquired by the radio wave state acquisition processing unit 70 is not limited to the aforementioned determination method, but, for example, a method to correct delay measured by the delay measurement processing unit 40 by adding a value associated with (proportional to) an index value of a radio wave state, a method to correct a threshold value referred to when a degree of congestion is estimated by the congestion detection means 51B (a threshold value used in control of the transmission unit 60) by adding a value associated with an index value of a radio wave state, or the like may be adopted, in combination with the aforementioned correction method.

Namely, the reference value correction processing means 52D is configured to temporarily correct a parameter (a congestion parameter) affecting detection of a degree of congestion, performed by the congestion detection means 51B when determining that delay increases due to a cause other than congestion.

Here, the aforementioned "method to correct by adding a value associated with an index value" is additionally described.

Since an error is likely to occur as the index value decreases in the environment in the second exemplary embodiment, re-transmission and error restoration by HARQ are likely to occur, and accordingly, possibility that increase in delay not caused by congestion occurs is high.

For this reason, in view of the above, the reference value correction processing means 52D may be configured to "correct so that the delay (d) decreases, as the index value (x) decreases", using a method represented by Eq. 2 or Eq. 3 below, for example, where delay measured by the delay measurement processing unit 40 is d, delay after correction is d', and an index value acquired by the radio wave state acquisition processing unit 70 is x.

(Eq. 2)

$$d' = d - a \times (b - x) \quad (2)$$

(Eq. 3)

$$d' = d \times (x - b)/a \quad (3)$$

Further, the reference value correction processing means 52D may be configured to "correct so that the threshold value (th) increases, as the index value (x) decreases", using a method represented by Eq. 4 or Eq. 5 below, for example, where a threshold value referred to when the congestion detection means 51B detects a degree of congestion is th, and a threshold value after correction is th'.

(Eq. 4)

$$th' = th + a \times (b - x) \quad (4)$$

(Eq. 5)

$$th' = th \times (b - x)/a \quad (5)$$

Here, in the aforementioned Eqs. 1 to 4, a and b are set values with plus or minus values, and are set in advance before correction processing is performed by the reference value correction processing means 52D.

Further, the configuration of the reference value correction processing means 52D is not limited to the aforementioned configuration, and a configuration to "correct so that the delay (d) decreases, as the index value (x) increases", or a configuration to "correct so that the threshold value (th) increases, as the index value (x) increases" may be adopted.

(Description of Operation)

Next, an operation of the data transmission device 12 shown in FIG. 5 is described.

Here, an operation of the data transmission device 12 from network delay measurement processing to data transmission rate control is the same as the operation (Steps S201 to S204 in FIG. 2) of the data transmission device 11 (in FIG. 1) described based on FIG. 2 in the first exemplary embodiment.

Therefore, an operation of the data transmission device 12 from network delay measurement processing to determination on a cause of occurrence of increase in delay and correction of a congestion parameter accompanied by the determination is described based on a flowchart shown in FIG. 5.

The radio wave state acquisition processing unit 70 acquires an index value of a radio wave state in the network 20 from the user terminal 30 or the base station 20A at a fixed time interval, and stores the index value in an internal memory or the like (not shown) (Step S501 in FIG. 5).

The reference value correction processing means 52D compares the index value of the radio wave state acquired by the radio wave state acquisition processing unit 70 with a predetermined set value, when the radio wave state acquisition processing unit 70 acquires the index value of the radio wave state or at a predetermined fixed time interval so as to perform determination on a cause of occurrence of the increase in delay (Step S502 in FIG. 5).

Namely, when determining that the delay increases due to a cause other than congestion in the network 20 (YES in Step S502 in FIG. 5), the reference value correction processing means 52D temporarily corrects the delay measured by the delay measurement processing unit 40 or the threshold value used in estimating a degree of congestion by the congestion detection means 51B (Step S503 in FIG. 5). Then, determination processing with respect to a succeeding data packet is performed.

On the other hand, when determining that the delay increases due to congestion in the network 20 (NO in Step S502 in FIG. 5), the reference value correction processing means 52D performs a determination processing with respect to a succeeding data packet, without correcting the aforementioned threshold value or the like.

Further, an execution content of each process in Steps S501 to S503 (in FIG. 5) described above may be programmed, and a series of the respective control programs may be configured to be implemented by a computer.

Advantageous Effects of Second Exemplary Embodiment

In the data transmission device 12 in the second exemplary embodiment, the reference value correction processing means 52D that determines a cause of occurrence of increase in delay based on a delay change pattern in the network or a radio wave state of a wireless portion is configured to significantly correct a congestion parameter used by the congestion detection means 51B when determining that the increase in delay is not caused by congestion.

Accordingly, when increase in delay occurs due to a cause other than congestion, because the congestion detection means 51B to be allowed to perform detection processing based on an adjusted congestion parameter, it is possible to prevent a problem of unnecessarily lowering a transmission rate by the transmission rate control means 51C, and thus, it is possible to enhance the throughput.

Namely, in the data transmission device 12, since the radio wave state acquisition processing unit 70 that acquires an index value of a radio wave state in a wireless portion of the network 20 from the user terminal 30 or the base station 20A at a fixed time interval, effectively functions, and significant traffic control is realized, erroneous detection of congestion can be prevented, and thus, it is possible to enhance transmission efficiency.

It is noted that the aforementioned exemplary embodiments are preferred examples of the data transmission device, the data transmission method, and the program therefor, and may include technically preferred various limitations. The technical scope of the present invention, however, is not limited to these configurations, unless otherwise specified.

The following is a summary of the novel technical features of the aforementioned exemplary embodiments. The invention, however, is not limited to the following.

(Supplementary Note 1)

A data transmission device provided with a transmission unit for transmitting data to a user terminal, including a transmission operation control unit having a determination function of determining whether or not increase in delay in data transmission is caused by congestion in a network, based on a predetermined reference, and a transmission rate control function of controlling an operation of the transmission unit so as not to lower a transmission rate when it is determined that the increase in delay is not caused by congestion by the determination function.

(Supplementary Note 2)

The data transmission device according to Supplementary Note 1, wherein the transmission operation control unit determines that increase in delay is not caused by congestion, when a phenomenon is represented that the delay in the data transmission sharply increases and then linearly decreases with respect to increase in a transmission time of each packet.

(Supplementary Note 3)

The data transmission device according to Supplementary Note 1, wherein the transmission operation control unit acquires a transmission time of an acknowledgement response with respect to transmission data from the user terminal, and determines that increase in delay is not caused by congestion, when an interval of the transmission time is smaller than a value obtained by dividing a data size of the transmission data by an available bandwidth of the network.

(Supplementary Note 4)

The data transmission device according to Supplementary Note 1, wherein the transmission operation control unit determines that increase in delay is not caused by congestion, when a time interval at which an acknowledgement response to transmission data is received from the user terminal is smaller than a value obtained by dividing a data size of the transmission data by an available bandwidth of the network.

(Supplementary Note 5)

The data transmission device according to Supplementary Note 1, wherein the transmission operation control unit determines that increase in delay is not caused by congestion, when acquiring a change pattern in which a time interval at which an acknowledgement response to transmission data is received from the user terminal is smaller than a value obtained by dividing a data size of the acknowledgement response by throughput of the data transmission.

(Supplementary Note 6)

The data transmission device according to Supplementary Note 1, further including a radio wave state acquisition processing unit that acquires an index value of a radio wave state in a wireless portion of the network, wherein the transmission operation control unit performs the determination based on a magnitude relation between the index value of the radio wave state and a predetermined set value.

(Supplementary Note 7)

The data transmission device according to Supplementary Note 1, further including a radio wave state acquisition processing unit that acquires an index value of a radio wave state in a wireless portion of the network, wherein the transmission operation control unit determines that increase in delay is not caused by congestion, when the index value of the radio wave state is smaller than a predetermined set value.

(Supplementary Note 8)

The data transmission device according to Supplementary Note 1, further including a radio wave state acquisition processing unit that acquires an index value of a radio wave state in a wireless portion of the network, wherein the transmission operation control unit determines that increase in delay is not caused by congestion, when the index value of the radio wave state is larger than a predetermined set value.

(Supplementary Note 9)

The data transmission device according to Supplementary Note 1, further including a radio wave state acquisition processing unit that acquires an index value of a radio wave state in a wireless portion of the network, wherein the transmission operation control unit determines that increase in delay is not caused by congestion, when the index value of the radio wave state is out of a predetermined set range.

(Supplementary Note 10)

The data transmission device according to any one of Supplementary Notes 1 to 9, wherein the transmission operation control unit performs correction of temporarily increasing a threshold value used in control of the transmission unit when determining that increase in delay is not caused by congestion, so as to control an operation of the transmission unit.

(Supplementary Note 11)

The data transmission device according to any one of Supplementary Notes 1 to 9, further including a delay measurement processing unit that measures delay in the data transmission, wherein the transmission operation control unit performs correction of temporarily decreasing delay measured by the delay measurement processing unit when determining that increase in delay is not caused by congestion, so as to control an operation of the transmission unit.

(Supplementary Note 12)

The data transmission device according to Supplementary Note 10, further including a delay measurement processing unit that measures delay in the data transmission, wherein the transmission operation control unit performs, as well as the correction, correction of temporarily decreasing delay measured by the delay measurement processing unit when determining that increase in delay is not caused by congestion, so as to control an operation of the transmission unit.

(Supplementary Note 13)

The data transmission device according to any one of Supplementary Notes 6 to 9, wherein the transmission operation control unit performs correction of adding a value associated with (proportional to) the index value of the radio wave state to a threshold value used in control of the transmission unit, so as to control an operation of the transmission unit.

(Supplementary Note 14)

The data transmission device according to any one of Supplementary Notes 6 to 9, further including a delay measurement processing unit that measures delay in the data transmission, wherein the transmission operation control unit performs correction of subtracting a value associated with (proportional to) the index value of the radio wave state from delay measured by the delay measurement processing unit, so as to control an operation of the transmission unit.

(Supplementary Note 15)

The data transmission device according to any one of Supplementary Notes 6 to 9, further including a delay measurement processing unit that measures delay in the data transmission, wherein the transmission operation control unit performs correction of adding a value associated with (proportional to) the index value of the radio wave state to a threshold value used in control of the transmission unit, or correction of subtracting a value associated with (proportional to) the index value of the radio wave state from delay measured by the delay measurement processing unit, so as to control an operation of the transmission unit.

(Supplementary Note 16)

The data transmission device according to any one of Supplementary Notes 6 to 9, further including a delay measurement processing unit that measures delay in the data transmission, wherein the transmission operation control unit performs correction of adding a value associated with (proportional to) the index value of the radio wave state to a threshold value used in control of the transmission unit, and correction of subtracting a value associated with (proportional to) the index value of the radio wave state from delay measured by the delay measurement processing unit, so as to control an operation of the transmission unit.

(Supplementary Note 17)

A data transmission method in a data transmission device provided with a transmission unit for transmitting data to a user terminal, including:

determining whether or not increase in delay in data transmission is caused by congestion in a network, based on a predetermined reference;

correcting a predetermined detection reference when it is determined that increase in delay is not caused by congestion;

detecting a degree of congestion based on the corrected detection reference; and controlling an operation of the transmission unit so as not to lower a transmission rate in accordance with the result of detection.

(Supplementary Note 18)

A data transmission program that causes a computer to execute, in a data transmission device provided with a transmission unit for transmitting data to a user terminal:

a delay cause determination function of determining whether or not increase in delay in data transmission is caused by congestion in a network, based on a predetermined reference;

a detection reference correction function of correcting a predetermined detection reference when it is determined that increase in delay is not caused by congestion by the delay cause determination function;

a congestion detection function of detecting a degree of congestion based on a detection reference corrected by the detection reference correction function; and a transmission rate control function of controlling an operation of the transmission unit so as not to lower a transmission rate in accordance with a result of detection by the congestion detection function.

This application is based upon and claims the benefit of priority from Japanese patent application No. 2012-276440, filed on Dec. 19, 2012, the disclosure of which is incorporated herein in its entirety by reference.

INDUSTRIAL APPLICABILITY

The present invention is applicable to an estimation device that estimates, from delay, a network condition such as an amount of queues staying in a network (an amount of stagnant packets), an available bandwidth, and a bit error rate. Further, the present invention is applicable to a transmission rate control device that controls a transmission rate by simulating a behavior equivalent to TCP in a protocol different from TCP such as UDP.

REFERENCE SIGNS LIST 11, 12 Data transmission device
20 Network
20A Base station
30 User terminal
40 Delay measurement processing unit
51, 52 Transmission operation control unit
51A Queue amount estimation means
51B Congestion detection means
51C Transmission rate control means
51D, 52D Reference value correction processing means
60 Transmission unit
70 Radio wave state acquisition processing unit

The invention claimed is:

1. A data transmission device provided with a transmission unit for transmitting data to a user terminal, comprising
a transmission operation control unit including a determination function of determining whether or not increase in delay in data transmission is caused by congestion in a network, based on a predetermined reference, and a transmission rate control function of controlling an operation of the transmission unit so as not to lower a transmission rate, when it is determined that increase in delay is not caused by congestion by the determination function;
a delay measurement processing unit that measures delay in the data transmission, wherein
the transmission operation control unit performs correction of temporarily decreasing delay measured by the delay measurement processing unit, when it is determined that increase in delay is not caused by congestion, so as to control an operation of the transmission unit.

2. The data transmission device according to claim 1, wherein
the transmission operation control unit determines that increase in delay is not caused by congestion, when a phenomenon is represented that delay in the data transmission sharply increases and then linearly decreases with respect to increase in a transmission time of each packet.

3. The data transmission device according to claim 1, wherein
the transmission operation control unit acquires a transmission time of an acknowledgement response to transmission data from the user terminal, and determines that increase in delay is not caused by congestion, when an interval of the transmission time is smaller than a value obtained by dividing a data size of the transmission data by an available bandwidth of the network.

4. The data transmission device according to claim 1, wherein
the transmission operation control unit determines that increase in delay is not caused by congestion, when a time interval at which an acknowledgement response to transmission data is received from the user terminal is smaller than a value obtained by dividing a data size of the transmission data by an available bandwidth of the network.

5. The data transmission device according to claim 1, further comprising
a radio wave state acquisition processing unit that acquires an index value of a radio wave state in a wireless portion of the network, wherein
the transmission operation control unit performs the determination based on a magnitude relation between an index value of the radio wave state and a predetermined setting value.

6. The data transmission device according to claim 5, further comprising
a delay measurement processing unit that measures delay in the data transmission, wherein
the transmission operation control unit performs correction of adding a value associated with an index value of the radio wave state to a threshold value used in control of the transmission unit, or correction of subtracting a value associated with an index value of the radio wave state from delay measured by the delay measurement processing unit, so as to control an operation of the transmission unit.

7. The data transmission device according to claim 1, wherein the transmission operation control unit determines that increase in delay is not caused by congestion, when acquiring a change pattern in which a time interval at which an acknowledgement response to transmission data is received from the user terminal is smaller than a value obtained by dividing a data size of the acknowledgement response by throughput of the data transmission.

8. The data transmission device according to claim 1, further comprising a radio wave state acquisition processing unit that acquires an index value of a radio wave state in a wireless portion of the network, wherein
the transmission operation control unit determines that increase in delay is not caused by congestion, when the index value of the radio wave state is out of a predetermined set range.

9. The data transmission device according to claim 1, wherein
the transmission operation control unit performs correction of temporarily increasing a threshold value used in control of the transmission unit when determining that increase in delay is not caused by congestion, so as to control an operation of the transmission unit;
further comprising:
a delay measurement processing unit that measures delay in the data transmission, wherein
the transmission operation control unit performs, as well as the correction, correction of temporarily decreasing delay measured by the delay measurement processing unit when determining that increase in delay is not caused by congestion, so as to control an operation of the transmission unit.

10. The data transmission device according to claim 5, further comprising
a delay measurement processing unit that measures delay in the data transmission, wherein
the transmission operation control unit performs correction of adding a value proportional to the index value of the radio wave state to a threshold value used in control of the transmission unit, or correction of subtracting a value proportional to the index value of the radio wave state from delay measured by the delay measurement processing unit, so as to control an operation of the transmission unit.

11. A data transmission method in a data transmission device provided with a transmission unit for transmitting data to a user terminal, comprising:
   determining whether or not increase in delay in data transmission is caused by congestion in a network, based on a predetermined reference;
   correcting a predetermined detection reference when it is determined that increase in delay is not caused by congestion;
   detecting a degree of congestion based on the corrected detection reference; and
   controlling an operation of the transmission unit so as not to lower a transmission rate in accordance with the result of detection;
   wherein a delay measurement processing unit measures delay in data transmission, and
   wherein a transmission operation control unit performs correction of temporarily decreasing delay measured by the delay measurement processing unit, when it is determined that increase in delay is not caused by congestion, so as to control an operation of the transmission unit.

12. The data transmission method according to claim 11, wherein
   the transmission operation control unit determines that increase in delay is not caused by congestion, when a phenomenon is represented that delay in the data transmission sharply increases and then linearly decreases with respect to increase in a transmission time of each packet.

13. The data transmission method according to claim 11, wherein
   the transmission operation control unit acquires a transmission time of an acknowledgement response to transmission data from the user terminal, and determines that increase in delay is not caused by congestion, when an interval of the transmission time is smaller than a value obtained by dividing a data size of the transmission data by an available bandwidth of the network.

14. The data transmission method according to claim 11, wherein
   the transmission operation control unit determines that increase in delay is not caused by congestion, when a time interval at which an acknowledgement response to transmission data is received from the user terminal is smaller than a value obtained by dividing a data size of the transmission data by an available bandwidth of the network.

15. The data transmission method according to claim 11, wherein
   a radio wave state acquisition processing unit acquires an index value of a radio wave state in a wireless portion of the network, wherein
   the transmission operation control unit performs the determination based on a magnitude relation between an index value of the radio wave state and a predetermined setting value.

16. A non-transitory computer-readable medium storing a data transmission program that causes a computer to execute, in a data transmission device provided with a transmission unit for transmitting data to a user terminal and a delay measurement processing unit that measures delay in the data transmission:
   a delay cause determination function of determining whether or not increase in delay in data transmission is caused by congestion in a network, based on a predetermined reference;
   a detection reference correction function of correcting a predetermined detection reference when it is determined that increase in delay is not caused by congestion by the delay cause determination function;
   a congestion detection function of detecting a degree of congestion based on a detection reference corrected by the detection reference correction function;
   a transmission rate control function of controlling an operation of the transmission unit so as not to lower a transmission rate in accordance with a result of detection by the congestion detection function; and
   a correction function of temporarily decreasing delay measured by the delay measurement processing unit, when it is determined that increase in delay is not caused by congestion, so as to control an operation of the transmission unit.

17. The non-transitory computer-readable medium according to claim 16, further comprising:
   a function of determining that increase in delay is not caused by congestion, when a phenomenon is represented that delay in the data transmission sharply increases and then linearly decreases with respect to increase in a transmission time of each packet.

18. The non-transitory computer-readable medium according to claim 16, further comprising:
   a function of acquiring a transmission time of an acknowledgement response to transmission data from the user terminal, and determines that increase in delay is not caused by congestion, when an interval of the transmission time is smaller than a value obtained by dividing a data size of the transmission data by an available bandwidth of the network.

19. The non-transitory computer-readable medium according to claim 16, further comprising:
   a function of determining that increase in delay is not caused by congestion, when a time interval at which an acknowledgement response to transmission data is received from the user terminal is smaller than a value obtained by dividing a data size of the transmission data by an available bandwidth of the network.

20. The non-transitory computer-readable medium according to claim 16, further comprising:
   a function of acquiring an index value of a radio wave state in a wireless portion of the network, wherein
   the transmission operation control unit performs the determination based on a magnitude relation between an index value of the radio wave state and a predetermined setting value.

* * * * *